Jan. 16, 1962 W. A. NORRIS 3,017,255
OXIDIZER
Filed July 2, 1959

INVENTOR.
W. ARTHUR NORRIS
BY
ATTORNEY

3,017,255
OXIDIZER
William Arthur Norris, 413 S. Curtis, Alhambra, Calif.
Filed July 2, 1959, Ser. No. 824,675
2 Claims. (Cl. 23—288)

This invention relates to an oxidizer.

The general object of the invention is to provide an oxidizer capable of use to remove unburned hydrocarbons from an exhaust source.

In the exhaust gases of a modern motor vehicle various substances are present, which substances collectively are frequently referred to as smog. These substances are frequently carbon monoxide, carbon dioxide, residual oxygen and nitrogen, sulphur dioxide, oxides of phosphorus, boron oxide, lead bromide, water vapor, and other substances, depending on the fuel materials employed. Further, partial oxidation of hydrocarbons also frequently results in the formation of aldehydes.

It is an object of my invention to provide means to treat the complicated mixtures which leave the combustion cylinders of an engine in such a way that a very large percentage of the substances will be rendered harmless.

A more specific object of the invention is to provide a novel combined smog reducing oxidizer and muffler.

Another object of the invention is to provide a novel oxidizer which may be used on each of the cylinders of a gasoline engine.

Another object of the invention is to provide an exhaust system for a multiple cylinder gasoline engine wherein an exhaust manifold is provided and wherein the manifold is connected by individual conduits with the exhaust port of each cylinder and wherein an oxidizer is provided in each of the individual conduits.

A further object of the invention is to provide an oxidizer which includes a cartridge element made of material which serves a catalyzer.

Another object of the invention is to provide a catalyzer including a spirally wound catalyzing element.

An additional object of the invention is to provide an oxidizer including a plurality of spaced tubes with spirally directed catalyzing elements arranged thereabout.

Other objects and advantages of the invention will be apparent from the following description taken in connection with the accompanying drawing, wherein.

Figure 1:
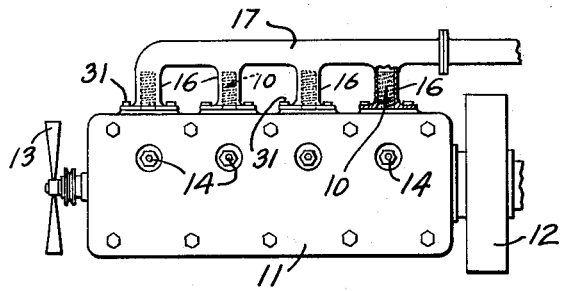
FIG. 1 is a side elevation of a gasoline engine with parts broken away showing my oxidizer.

Referring to the drawing by reference characters an oxidizer embodying the features of my invention is shown at 10. The oxidizer is shown as used with a four cylinder gasoline engine 11 which has the usual flywheel 12 and cooling fan 13. The engine has spark plugs 14.

The engine, as shown, has an exhaust port 15 for each cylinder. Each exhaust port communicates with a conduit 16 and the conduit 16 communicates with an exhaust manifold 17.

The construction is such that when the engine is in operation the exhaust gases pass through the ports 15 into the conduit 16 and from the conduit 16 the gases enter the manifold 17.

In order to provide for oxidation of the materials passing through the ports 15, my shown construction includes a plurality of tubes 18 and 19, and a central cylindrical member 20. The tube 18 has spaced ears 21 which extend therefrom. About the tube 18 I mount a continuous catalytic member 22 which is spirally directed in advancing manner from the port 15. The member 22 is shown as a coiled wire which may be made of a catalytic material such as vanadium oxide, or may be made of a nickel-chromium alloy or other suitable material. The particular material of which the catalyzing agent is made forms no part of the present invention so long as it is not affected by the exhaust gases and performs its catalytic function in a suitable manner.

The tube 18 is provided with a plurality of holes 23. About the tube 19 and within the tube 18 I arrange a second coiled wire catalyzer 24 which has the same general spiral arrangement and is arranged similar to the catalyzer 22. The tube 19 is provided with apertures 25 similar to the apertures 23. About the inner member 20 and within the tube 19 I arrange a third coiled wire catalyzer 26 which is preferably constructed and arranged similar to the catalyzers 22 and 24.

Figure 2:
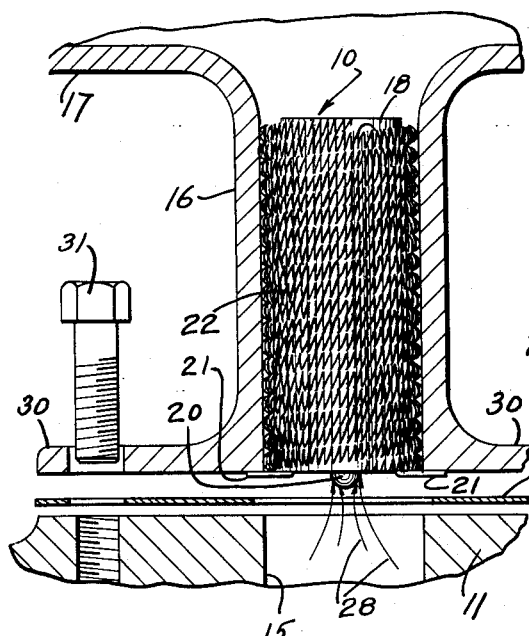
FIG. 2 is a sectional view through the exhaust conduit showing the oxidizer in elevation.
Figure 3:
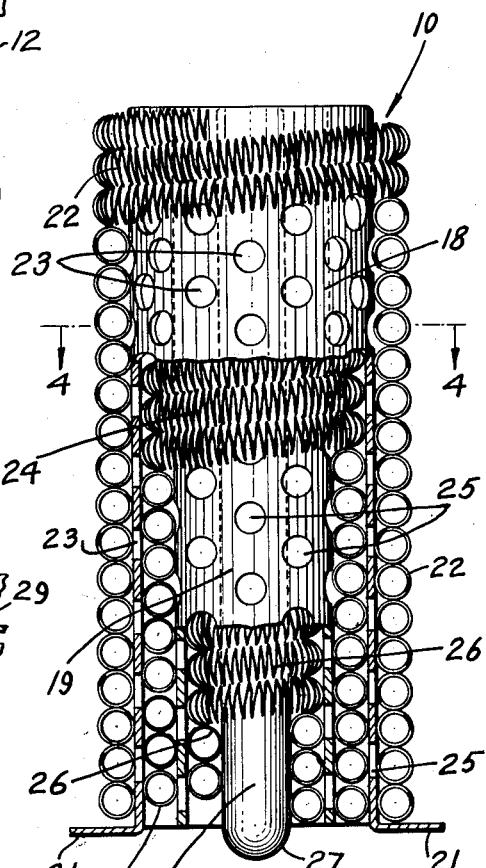
FIG. 3 is an enlarged elevational view partly in section showing the oxidizer.
Figure 4:
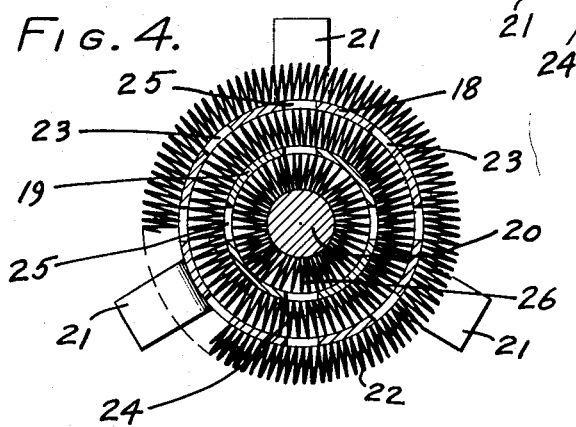
FIG. 4 is a top plan view of the oxidizer.

The tubes 18 and 19 and the cylindrical member 20 may, like the coiled wire catalyzers be made of material which is inert and is not affected by the exhaust gases. The lower end of the cylindrical member 20 is rounded as at 27 to cause the exhaust gases which impinge thereon to be spread out as indicated by the arrows 28 in FIG. 2 so that they will pass through the various coils.

The members 22, 24 and 26 are made of material which is somewhat resilient and these members are thus in the nature of coiled springs. In assembly the member 26 may be arranged spirally about the member 20 and may be placed under slight tension to cause the member 26 to hug the member 20. The tube 19 may then be placed about the member 26 and then the member 24 may be wrapped about the tube 18 to cause it to hug the tube. The tube 18 may then be slipped into place and the oxidizer 22 may be wound about the tube 18 in tight engagement therewith.

To install the oxidizers the manifold 17 is removed by removing bolts 31 and one of the oxidizers is inserted in each of the conduits 16. The manifold is then replaced and the tongues 21 are clamped between the manifold gasket 29 and the flanges 30 of the conduit 16. The bolts 31 are then tightened and the apparatus is then ready for use.

In use, when the engine is started the hot exhaust gases quickly heat the elements 22, 24 and 26 to their operating temperature. The direction of the coiled wire in the loops and of the wound coils are all such as not to unduly impede the movement of the advancing exhaust column but the impingement of the gases in the wires does set up a turbulence which causes the gases to be thrown back and forth against the wires as the gases advance. This increases the oxidation effect and also adds a muffler effect so that not only are the gases purified but also the sound is muffled.

The flow of exhaust gases from the exhaust port is not uniform but consists of distinct puffs which continually pass from maximum discharge to minimum discharge and vice versa. This puffing exhaust action further increases the effectiveness of my oxidizer since it repeatedly slows down the rate of advance of the exhaust gases and allows increased contact of the gases with the catalytic coils.

Having thus described my invention, I claim:

1. An oxidizing cartridge including a central cylindrical member, a coiled wire spirally arranged about the cylindrical member, a sleeve about the spirally arranged coil, a second coiled wire spirally arranged about the sleeve, a second sleeve arranged about the second spirally arranged coiled wire, and a third coiled wire spirally arranged about the second sleeve, each of said coiled wires being made of catalytic material, each of said sleeves having perforations therein permitting passage of gases into and out of the sleeves.

2. An oxidizing cartridge including a central cylindrical member, a resilient coiled wire spirally arranged about and resiliently engaging the cylindrical member, a sleeve open at both ends and arranged about and engaging the spirally arranged coil, a second resilient coiled wire spirally arranged about and resiliently engaging the sleeve, a second sleeve open at both ends and arranged about and engaging the second spirally arranged coiled wire, and a third resilient coiled wire spirally arranged about and resiliently engaging the second sleeve, each of said coiled wires being made of catalytic material, each of said sleeves having perforations therein permitting passage of gases into and out of the sleeves.

References Cited in the file of this patent

UNITED STATES PATENTS

| | | |
|---|---|---|
| 707,611 | Moujeau | Aug. 26, 1902 |
| 957,226 | Logan | May 10, 1910 |
| 1,772,746 | Cook | Aug. 12, 1930 |
| 1,940,700 | Riehm | Dec. 26, 1933 |
| 1,970,700 | Kendall | Aug. 21, 1934 |
| 2,660,520 | Bethea | Nov. 24, 1953 |
| 2,699,989 | Houdry | Jan. 18, 1955 |
| 2,743,019 | Kovacs | Apr. 24, 1956 |
| 2,792,909 | Court | May 21, 1957 |
| 2,833,415 | Wilkinson | May 6, 1958 |

FOREIGN PATENTS

| | | |
|---|---|---|
| 715,243 | France | Nov. 27, 1931 |